(12) United States Patent
Weller et al.

(10) Patent No.: US 11,784,430 B2
(45) Date of Patent: Oct. 10, 2023

(54) METHOD FOR PRODUCING AN ANGLED PLUG-IN CONNECTOR, AN ANGLED PLUG-IN CONNECTOR AND A SENSOR

(71) Applicant: Robert Bosch GmbH, Stuttgart (DE)

(72) Inventors: Stefan Weller, Heidelberg (DE); Thomas Breinlinger, Immenstadt (DE); Frederic Cousin, Freiberg Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 305 days.

(21) Appl. No.: 17/288,355

(22) PCT Filed: Oct. 23, 2019

(86) PCT No.: PCT/EP2019/078828
§ 371 (c)(1),
(2) Date: Apr. 23, 2021

(87) PCT Pub. No.: WO2020/089001
PCT Pub. Date: May 7, 2020

(65) Prior Publication Data
US 2021/0384664 A1    Dec. 9, 2021

(30) Foreign Application Priority Data
Oct. 31, 2018    (DE) .................. 10 2018 218 629.4

(51) Int. Cl.
*H01R 13/405*    (2006.01)
*H01R 13/73*    (2006.01)
(Continued)

(52) U.S. Cl.
CPC .......... *H01R 13/405* (2013.01); *H01R 13/73* (2013.01); *H01R 43/16* (2013.01); *H01R 43/18* (2013.01)

(58) Field of Classification Search
CPC ...... H01R 13/405; H01R 13/73; H01R 43/16; H01R 43/18; H01R 43/24; H01R 43/00; H01R 4/70
(Continued)

(56) References Cited

U.S. PATENT DOCUMENTS 7,965,075 B2 * 6/2011 Mueller ................. H01R 43/16
                                                            324/207.25
10,072,952 B2 * 9/2018 Contet .................... H01R 13/22

FOREIGN PATENT DOCUMENTS

DE    198 51 455 A1    8/1999
DE    101 41 218 A1    3/2003
(Continued)

OTHER PUBLICATIONS

International Search Report corresponding to PCT Application No. PCT/EP2019/078828, dated Jan. 30, 2020 (German and English language document) (5 pages).

*Primary Examiner* — Peter G Leigh
(74) *Attorney, Agent, or Firm* — Maginot, Moore & Beck LLP

(57) ABSTRACT

A method is disclosed for producing an angled plug-in connector, which has an insert-molded, prefabricated busbar stack that has at least two busbars which are next to one another, are spaced apart by an insulating gap, and are made of an electrically conductive planar material. Each of the busbars includes a starting region which is in a reference plane and oriented in a reference direction, an end region which is bent out of the reference plane about a creasing angle and oriented in a transverse direction, a curved transition region from the reference direction into the transverse direction, and a bending region oriented along a bending line. The bending line is oriented, with respect to the reference direction, at a bending line angle, and the busbar (Continued)

stack is insert moulded between the starting region and the end region having a housing made of an electrically non-conductive plastics material.

11 Claims, 4 Drawing Sheets

(51) Int. Cl.
*H01R 43/16* (2006.01)
*H01R 43/18* (2006.01)

(58) Field of Classification Search
USPC .......................................................... 439/571
See application file for complete search history.

(56) References Cited

FOREIGN PATENT DOCUMENTS

| | | | | |
|---|---|---|---|---|
| DE | 10 2005 043 413 A1 | 3/2007 | | |
| DE | 102005043413 A1 * | 3/2007 | ........... | G01D 11/245 |
| DE | 10 2016 210 532 A1 | 12/2017 | | |
| EP | 2613411 A1 * | 7/2013 | ........... | H01R 13/646 |
| JP | 2002-175853 A | 6/2002 | | |
| JP | 2002175853 A * | 6/2002 | | |
| JP | 2009-508126 A | 2/2009 | | |

\* cited by examiner

METHOD FOR PRODUCING AN ANGLED PLUG-IN CONNECTOR, AN ANGLED PLUG-IN CONNECTOR AND A SENSOR

This application is a 35 U.S.C. § 371 National Stage Application of PCT/EP2019/078828, filed on Oct. 23, 2019, which claims the benefit of priority to Serial No. DE 10 2018 218 629.4, filed on Oct. 31, 2018 in Germany, the disclosures of which are incorporated herein by reference in their entirety.

The disclosure relates to a method for producing an angled plug-in connector having an overmolded busbar stack, an angled plug-in connector having an overmolded busbar stack and a sensor having an angled plug-in connector.

BACKGROUND

Electrically conductive conductor paths can be overmolded with an electrically non-conductive plastic material in order to fix the position of the conductor paths and to fix an insulation distance between the conductor paths.

SUMMARY

Against this background, with the approach presented here, a method for producing an angled plug-in connector having an overmolded busbar stack, an angled plug-in connector having an overmolded busbar stack and finally a sensor having an angled plug-in connector are presented herein. Advantageous developments and improvements in the approach presented here are revealed in the description.

Embodiments of the present disclosure can advantageously enable the busbars for a plug-in connector which has interlinked connection regions in two spatial directions to be provided by means of a single bending procedure.

A method for producing an angled plug-in connector having an overmolded busbar stack is proposed, wherein, to prefabricate the busbar stack, at least two busbars next to one another in a reference plane, spaced from one another at least by an insulation distance, temporarily connected to one another via separating webs and each having a start region aligned in a reference direction, an end region aligned in a transverse direction, a curved transition region from the reference direction to the transverse direction and a bending region are cut from an electrically conductive flat material, wherein the bending regions of the busbars are aligned on a common bending line and the bending line is aligned at a bending line angle with respect to the reference direction, the busbars are connected to at least one bridge using a first injection molding tool, which bridge is made from an electrically non-conductive plastic material, the separating webs are severed, the busbars are deformed at the bending regions using a bending tool, wherein the end regions of the busbars are folded out of the reference plane through a folding angle at the bending line; and, between the start region and the end region, using a second injection molding tool, the prefabricated busbar stack is overmolded with a housing made from an electrically non-conductive plastic material.

Furthermore, an angled plug-in connector having an overmolded, prefabricated busbar stack is proposed, wherein the busbar stack has at least two busbars lying next to one another, spaced from one another at least by an insulation distance and made from an electrically conductive flat material, wherein the busbars each have a start region aligned in a reference direction in a reference plane, an end region folded out of the reference plane through a folding angle and aligned in a transverse direction, a curved transition region from the reference direction to the transverse direction and a bending region aligned on a bending line, wherein the bending line is aligned at a be line angle with respect to the reference direction, wherein, between the start region and the end region, the busbar stack is overmolded with a housing made from an electrically non-conductive plastic material.

A sensor having a plug-in connector according to the approach presented here is furthermore proposed, in which sensor electronics of the sensor are connected to the start regions, wherein the end regions of the busbars form angled electrical connections of the sensor.

Ideas relating to embodiments of the present disclosure can, amongst other things, be seen as being based on the thoughts and knowledge described below.

A busbar stack can refer to a bundle of busbars which are arranged next to one another and follow substantially the same course. The busbars of the busbar stack are produced in a common operating step. A plurality of busbar stacks can also be produced next to one another and in the same operating step. An electrically conductive flat material can be a metal sheet. The flat material can be provided for cutting piece by piece or as a strip material. The cutting procedure can take place by laser cutting or punching, for example.

The first injection molding tool can have, for each overmoldable busbar stack, at least one mold cavity for primary shaping of the bridge. A plurality of busbar stacks can also be overmolded in one operating step in the injection molding tool. The injection molding tool can also have recesses for the busbars. The bushbars can be tightly enclosed by the recesses in order to seal the mold cavities to prevent the plastic material from escaping.

The separating webs can likewise be severed by punching or laser cutting. The separating webs which fail off can be reused. For the folding procedure, the bending line can be bent at a bending edge. The bending regions can be bent with a defined bending radius. The severing of the separating webs can take place with the folding procedure in a common operating step.

The second injection molding tool can have receptacles for the bridges. The busbar stack can be aligned in the second injection molding tool via the bridges.

The busbars for a plurality of busbar stacks can be cut from the flat material in a regular pattern. The busbar stacks can remain connected to an edge region of the pattern via the separating webs. The flat material can be transported to the first injection molding tool by the edge region. The busbar stacks can be separated from the pattern when severing the separating webs. The pattern can, in particular, be cut from strip material. The busbar stack can be transported and aligned by means of the edge region.

The bridges can be produced from the same plastic material as the housing. The bridges can merge into the housing. A good connection can thus be achieved.

The end regions can be arranged parallel, laterally offset from the bending line. The end regions can thus be rotated about the bending line during the folding procedure and aligned symmetrically with respect to the reference plane after the folding procedure. The transverse direction, within a manufacturing tolerance, can be aligned at the bending line angle with respect to the reference direction. The bending line angle can be freely selected according to requirements.

The busbars can each have at least one offset region. An offset region can be arranged between the start region and the bending region. Alternatively or additionally, an offset region can be arranged between the transition region and the end region. A parallel displacement of two adjacent regions can be achieved via an offset region. The plug-in connector can have a compact design as a result of the offset region, in particular as a result of two offset regions.

The start regions and/or the end regions can be formed as plug pins and can taper conically. The start regions and/or end regions can protrude at least partially from the housing. A conical design enables the plug pins to be easily inserted into a corresponding mating piece.

In the region of the start regions and/or end regions, the housing can be elongated beyond an end of the busbars in the form of a tube. The elongation of the housing can serve as protection for the start regions and/or end regions. Additionally, the elongation can have guide surfaces for guiding a mating piece of the plug-in connector. At least one locking element can likewise be provided on the elongation in order to lock the mating piece in a mated position.

The housing can have a fastening element for fastening the plug-in connector on a structural component. A fastening element can be a fastening eye, for example. The fastening eye can project laterally beyond the housing. A structural component can be part of a wheel suspension, for example.

It should be pointed out that some of the possible features and advantages of the disclosure are described herein with reference to different embodiments. A person skilled in the art recognizes that the features of the method, the plug-in connector and the sensor can be combined, adapted or interchanged in a suitable manner to arrive at further embodiments of the disclosure.

BRIEF DESCRIPTION OF THE DRAWINGS

Embodiments of the disclosure are described below with reference to the accompanying drawings, wherein neither the drawings nor the description are to be interpreted as restricting the disclosure.

The figures are merely schematic and are not drawn to scale. The same reference signs denote features which are the same or which have the same effect in the figures.

DETAILED DESCRIPTION

Figure 1A:
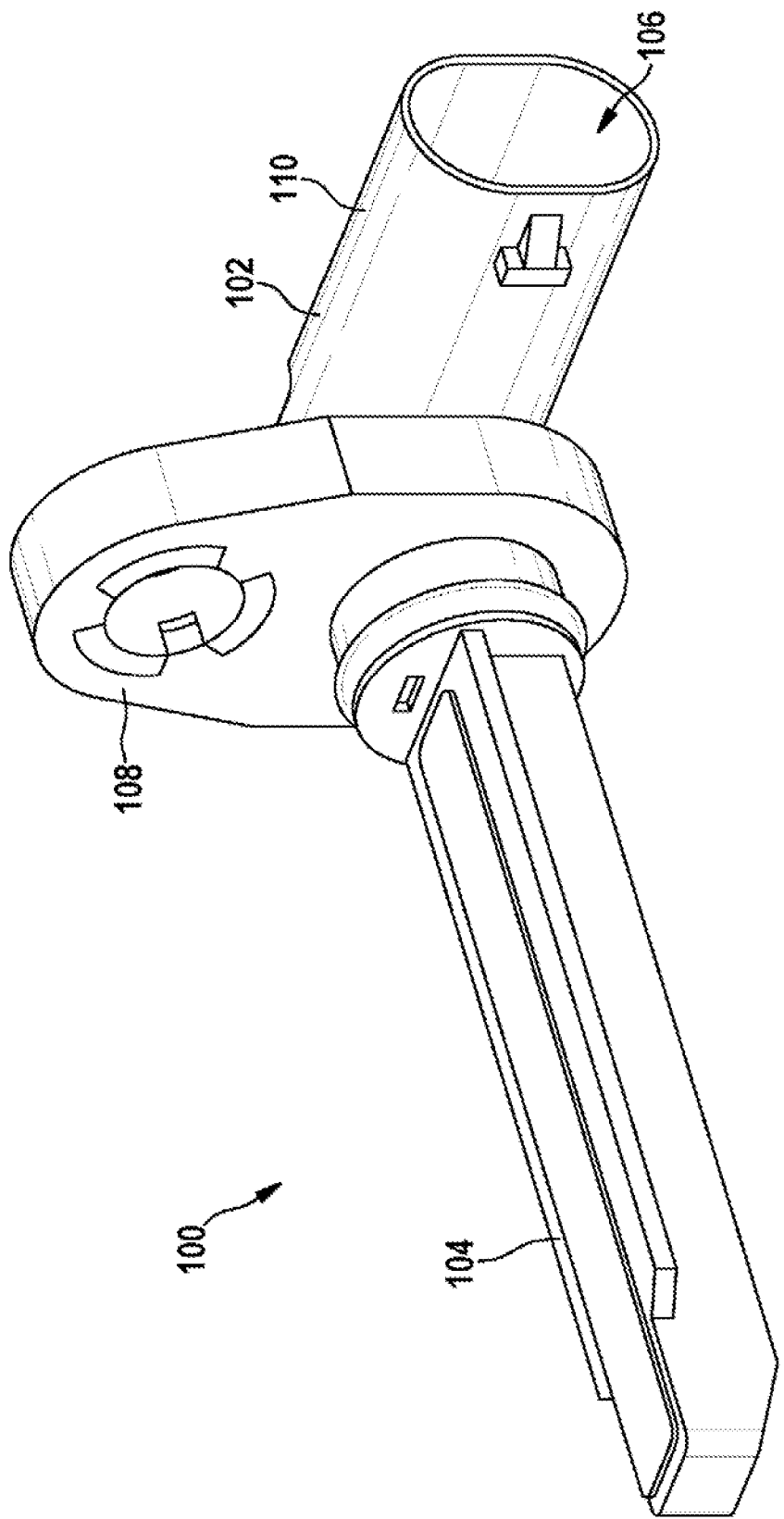
FIG. 1a shows an illustration of a sensor according to an exemplary embodiment.

FIG. 1a shows an illustration of a sensor 100 according to an exemplary embodiment. The sensor 100 is a wheel speed sensor here for a wheel of a vehicle. The sensor 100 is here composed of a plurality of individual parts. A plug-in connector 102 is connected to a carrier 104 for sensor electronics of the sensor 100. Owing to the limited installation space in the region of a wheel suspension of the vehicle, the sensor 100 has an angled form in which the connector 102 plug-in connector 102 has a connection for the sensor electronics, which is aligned in a main direction of extent of the carrier, and a plug-in coupling 106 as an electrical connection of the sensor 100, which is aligned transversely to the main direction of extent.

The sensor 100 furthermore has a fastening element 108 for fastening to the wheel suspension. The fastening element is arranged at the level of the connection between the plug-in connector 102 and the carrier 104. The fastening element 108 is designed as a fastening eyelet here. A fastening direction of the eyelet is aligned substantially parallel to the main direction of extent of the carrier 104.

In an exemplary embodiment, the plug-in connector 102 and the carrier 104 are constructed in one piece. The plug-in connector 102 and the carrier 104 are constructed in a common housing 110. In this case, the sensor electronics can be tightly overmolded when producing the sensor or arranged in a closable recess of the housing 110 after the injection molding process and connected to the busbars overmolded with the housing 110.

In an exemplary embodiment, the housing 110 is constructed in the form of a tube for forming the plug-in coupling. The busbars are protected against damage and against being touched in an interior of the plug-in coupling. The busbars are covered by the housing 110 here. The housing 110 extends beyond the busbars.

Figure 1B:
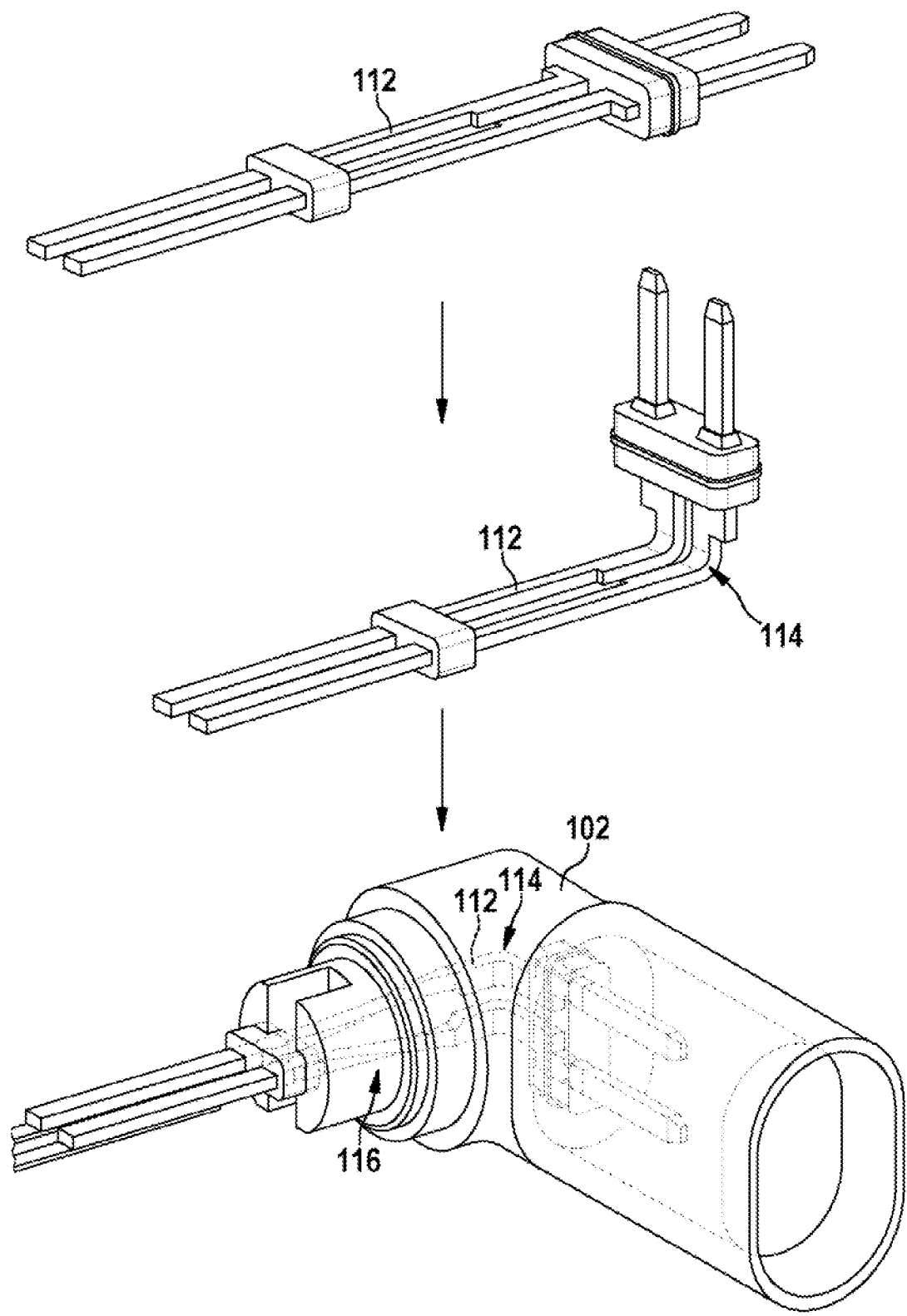
FIG. 1b shows illustrations of a production process of a conventional busbar stack for a plug-in connector.

FIG. 1b shows illustrations of a production process of conventional electrical contact pins 112 for a plug-in connector 102. The conventional contact pins 112 are cut out, bent and twisted. The conventional contact pins 112 can be installed in a conventional sensor 100, for example. The contact pins 112 are cut from a planar sheet. The cut-out contact pins 112 have a form which stretches substantially in one direction. After being cut out, the contact pins 112 are pre-overmolded. One end of the contact pin 112 in each case is folded out of the plane at a bending point 114. The contact pins 112 are then helically twisted with respect to one another in a twisting region 116 in order to align the folded ends laterally. In this case, the twisting is not completely reproducible, thereby hampering further processing to form the plug-in connector 102.

Figure 2:
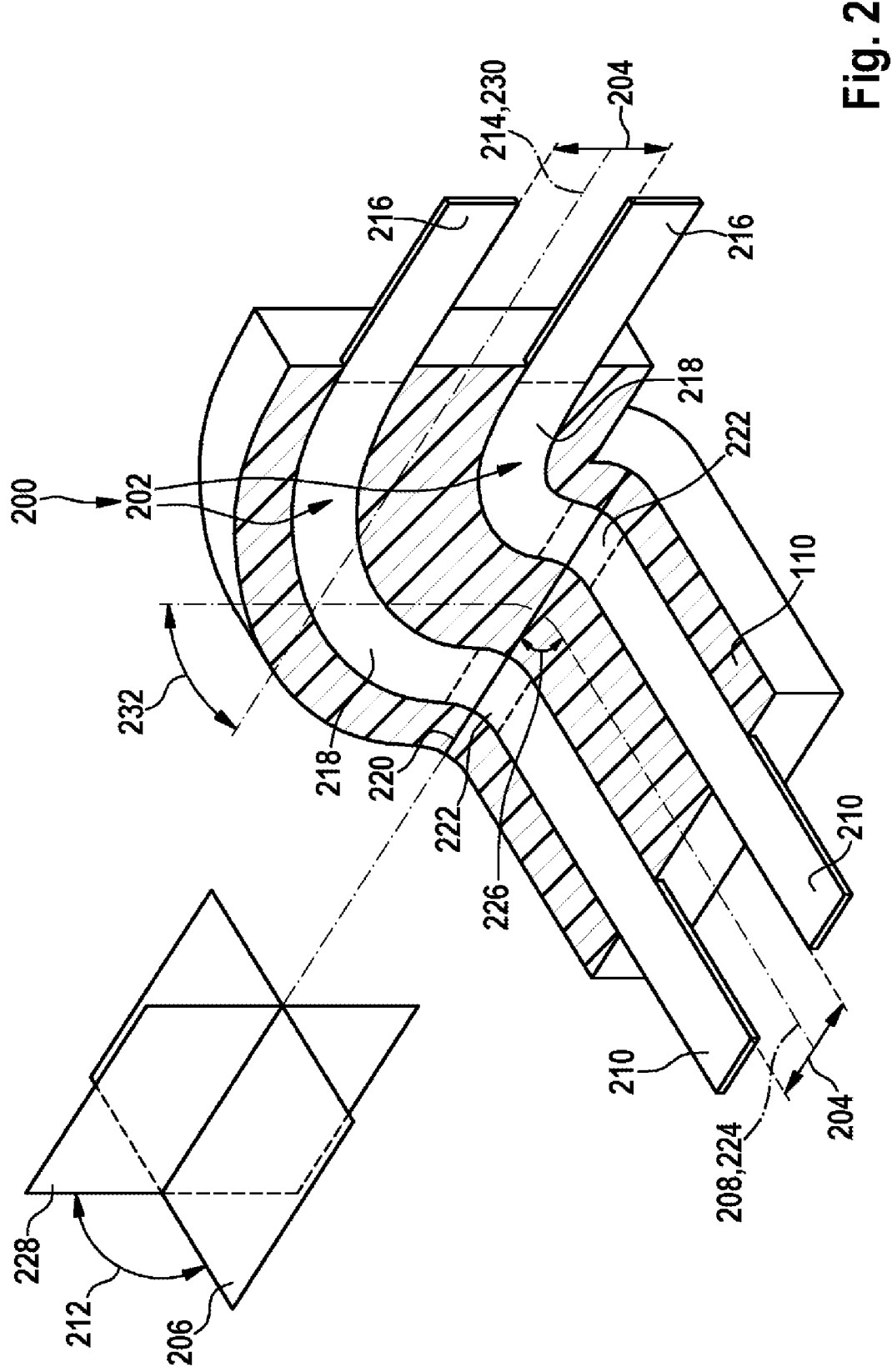
FIG. 2 shows a sectional illustration of a plug-in connector according to an exemplary embodiment.

FIG. 2 shows a sectional illustration of a plug-in connector 102 according to an exemplary embodiment. The plug-in connector 102 corresponds substantially to the plugin connector illustrated in FIG. 1. The plug-in connector 102 has a prefabricated novel busbar stack 200 overmolded with the housing 110. The busbar stack 200 has at least two busbars 202 lying next to one another and made from an electrically conductive flat material or strip material. The busbars 202 are spaced from one another at least by an insulation distance 204. The busbars 202 each have a start region 210 aligned in a reference direction 208 in a reference plane 206, an end region 216 folded out of the reference plane 206 through a folding angle 212 and aligned in a transverse direction 214, a curved transition region 218 from the reference direction 208 to the transverse direction 214 and a bending region 222 aligned on a bending line 220.

The bending regions 222 are arranged between the start regions 210 and the transition regions 218. The reference direction 208 is illustrated here by a center line 224 between the start regions 210. The start regions 210 are aligned parallel to one another. The end regions 216 are likewise aligned parallel to one another. The start regions 210 and the end regions 216 project partially out of the housing 110.

The bending line 220 is aligned at a bending line angle 226 with respect to the reference direction 208. The bending line 220 therefore intersects the center line 224 at the bending line angle 226. The end regions 216 and the transition regions 218 lie in a folding plane 228 extending transversely to the reference plane 206 through the folding angle 212. The folding plane 228 and the reference plane 206 intersect one another in the bending line 220. An elongation of the center line 224 is folded through the folding angle 212 at the bending line 220 and extends further in the folding plane 228. The transverse direction 214 is illustrated here by a further center line 230 between the end regions 216. An elongation of the further center line 230 intersects the elongation of the center line 224 at a transverse angle 232. The transverse angle 232 corresponds to the bending line angle 226 here. The further center line 230 extending in the transverse direction 214 therefore lies parallel to the bending line 220 in the folding plane 228.

Between the start region 210 and the end region 216, the busbar stack 200 is overmolded with the housing 110 made from an electrically non-conductive plastic material. The start regions 210 and the end regions 216 are partially exposed and protrude from the housing 110.

Figure 3:
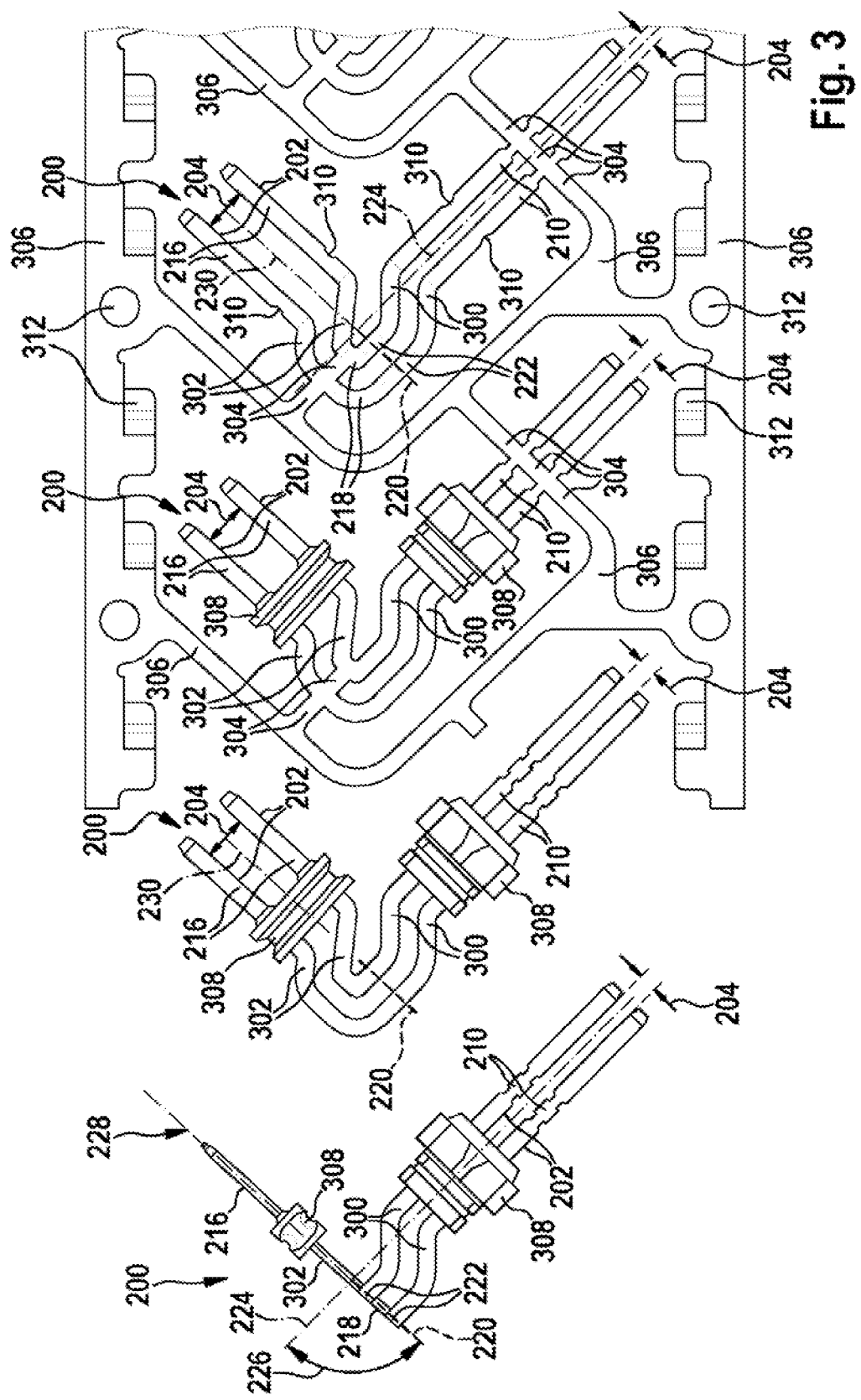
FIG. 3 shows an illustration of intermediate manufacturing states for the prefabrication of busbar stacks according to an exemplary embodiment.

FIG. 3 shows an illustration of intermediate manufacturing states for the prefabrication of a busbar stack 200 according to an exemplary embodiment. In this case, the busbar stack 200 corresponds substantially to the busbar stack in FIG. 2. Intermediate manufacturing states prior to the overmolding for producing the housing are illustrated. In contrast to the illustration FIG. 2, the end regions 216 are at a greater distance 204 from one another than the start regions 210. In addition to the illustration in FIG. 2, the busbars 202 have offset regions 300, 302 between the start regions 210 and the end regions 216. The first offset regions 300 are arranged between the start regions 210 and the bending regions 222. The second offset regions 302 are arranged between the transition regions 218 and the end regions 216.

As a result of the first offset regions 300, the bending regions 222 and the transition regions 218 are arranged laterally offset from the center line 224 by a first offset. As a consequence of the first offset, the end regions 216 are arranged nearer to the start regions 210.

The busbar stack 200 can therefore be constructed compactly. As a result of the second offset regions 302, the transition regions 218 are arranged laterally with respect to the further center line 230 by a second offset. The second offset has a different value for each busbar 202, thereby resulting in the greater distance 204. As a result of the second offset regions 302, the further center line 230, within a manufacturing tolerance, is aligned coaxially to the bending line 220 through both bending regions 222. After the folding procedure, one of the end regions 216 comes to lie at a distance above the reference plane, whilst the other end region 216 comes to lie at the same distance below the reference plane.

The bending line angle 226 is greater than 90° here. In particular, the bending line angle 226 is 92.5°. The bending line angle 226 can be varied to cover different installation situations.

In the first intermediate manufacturing state, the busbars are cut from a sheet, but are still connected to an edge region 306 of the sheet and to one another via the separating webs 304. During the cutting-out procedure, lateral depressions 310 have been cut out of the busbars 202 in order to enable a form fit with bridges 308 made from a plastic material. The end regions 216 are formed as plug pins of a plug-in connection and have a conically tapered design.

In the second intermediate manufacturing state, the busbars 202 are still connected to the edge region 306 and to one another via the separating webs 304. Using a first injection molding tool, the bridges 308 made from the electrically non-conductive plastic material have been injection molded in the region of the depressions 310. Since the plastic material fills the depressions 310, the form fit between the busbars 202 and the bridges 308 has been established during the overmolding of the busbar stack 200. A first bridge 308 has been injection molded between the start regions 210 and the first offset regions 300. A second bridge 308 has been injection molded between the end regions 216 and the second offset regions 302.

In the third intermediate manufacturing state, the separating webs 304 have been separated. The busbar stack 200 is now no longer connected to the edge region 306. The busbars 202 are likewise no longer connected to one another in an electrically conductive manner. The bridges 308 ensure a mechanical connection and the distances 204 between the busbars 202.

In the fourth manufacturing step, the bending regions are deformed and the end regions 216, the second offset regions 302 and the transition regions 218 have been folded through the folding angle with respect to the first offset regions 300 still arranged in the reference plane and the start regions 210. The end regions 216, the second offset regions 302 and the transition regions 218 are now arranged in the folding plane 228.

In a subsequent manufacturing step, the busbar stack 200 is placed in a second injection molding tool and the housing is injection molded thereon. When the busbars 202 are overmolded with the same plastic material for the housing as that for the bridges 308, the plastic material of the bridges 308 can be at least partially melted and mixed with the injected plastic material. If the plastic materials are different, a melting temperature of the bridges 308 determines whether mixing will take place.

In an exemplary embodiment, the busbar stack 200 is punched from a continuous material or roll material in order to achieve the first intermediate manufacturing state. In this case, the busbar stack 200 and the edge region 306 form a regular pattern in which multiple busbar stacks 200 of the same type are arranged next to one another. During the punching procedure, handling geometries 312 can be punched into the edge region 306. Using the handling geometries 312, the continuous material can be transported from processing step to processing step and aligned in the tools which are used. The busbar stacks 200 are separated by separating the separating webs 308.

Finally, it should be pointed out that terms such as "having", "comprising", etc. do not exclude other elements or steps and terms such as "a" do not exclude a plurality. Reference signs in the claims should not be regarded as restrictive.

The invention claimed is:

1. A method for producing an angled plug-in connector having an overmolded busbar stack, the method comprising:
  prefabricating a busbar stack by cutting at least two busbars lying next to one another in a reference plane from an electrically conductive flat material, the at least two busbars spaced from one another at least by an insulation distance, temporarily connected to one another via separating webs, and each of the at least two busbars in a planar configuration and having, in the reference plane, (i) a start region aligned in a reference direction, (ii) an end region aligned in a transverse direction, (iii) a curved transition region from the reference direction to the transverse direction, and (iv) a bending region, wherein the bending regions of the at least two busbars are aligned on a common bending line and the common bending line is aligned at a bending line angle with respect to the reference direction;

connecting the at least two busbars to at least one bridge using a first injection molding tool with the prefabricated busbar stack in the planar configuration, wherein the at least one bridge is made from a first electrically non-conductive plastic material;

severing the separating webs;

deforming the at least two busbars at the bending regions out of the planar configuration using a bending tool, wherein the end regions of the busbars are folded out of the reference plane through a folding angle at the common bending line; and overmolding the busbar stack with a housing made from a second electrically non-conductive plastic material between the start region and the end region of each of the at least two busbars using a second injection molding tool.

2. The method as claimed in claim 1, further comprising:

the prefabricating of the at least two busbars including cutting the at least two busbars for a plurality of busbar stacks from the flat material in a regular pattern, the at least two busbars of the plurality of busbar stacks remaining connected to an edge region of the pattern via the separating webs;

transporting the flat material to the first injection molding tool by the edge region; and separating the plurality of busbar stacks from the pattern when severing the separating webs.

3. The method as claimed in claim 1, wherein the first and second electrically non-conductive plastic materials are the same.

4. The method of claim 1, wherein the common bending line is parallel to one of the reference direction and the transverse direction.

5. An angled plug-in connector comprising:

an overmolded, prefabricated busbar stack having at least two busbars lying next to one another, spaced from one another at least by an insulation distance and made from an electrically conductive flat material, wherein each of the at least two busbars comprises:

a start region aligned in a reference direction in a reference plane;

an end region folded out of the reference plane through a folding angle and aligned in a transverse direction;

a curved transition region from the reference direction to the transverse direction; and a bending region aligned on a bending line, wherein the bending line is aligned at a bending line angle with respect to the reference direction; and a housing made from an electrically non-conductive plastic material overmolded over the prefabricated busbar stack between the start region and the end region of each of the at least two busbars, wherein the transverse direction, within a manufacturing tolerance, is aligned at the bending line angle with respect to the reference direction.

6. The angled plug-in connector as claimed in claim 5, wherein the end regions of the at least two busbars are arranged parallel to one another and are laterally offset from the bending line.

7. The angled plug-in connector as claimed in claim 5, wherein each of the at least two busbars further comprises at least one offset region arranged between the start region and the bending region and/or between the transition region and the end region.

8. The angled plug-in connector as claimed in claim 5, wherein the start regions and/or the end regions are formed as plug pins and taper conically.

9. The angled plug-in connector as claimed in claim 5, wherein the housing includes a tube portion elongated beyond an end of the at least two busbars adjacent to the start regions and/or the end regions.

10. The angled plug-in connector as claimed in claim 5, wherein the housing includes a fastening element configured to fasten the plug-in connector on a structural component.

11. A sensor comprising:

a plug-in connector comprising:

an overmolded, prefabricated busbar stack having at least two busbars lying next to one another, spaced from one another at least by an insulation distance and made from an electrically conductive flat material, wherein each of the at least two busbars comprises:

a start region aligned in a reference direction in a reference plane;

an end region folded out of the reference plane through a folding angle and aligned in a transverse direction;

a curved transition region from the reference direction to the transverse direction; and a bending region aligned on a bending line, wherein the bending line is aligned at a bending line angle with respect to the reference direction; and a housing made from an electrically non-conductive plastic material overmolded over the prefabricated busbar stack between the start region and the end region of each of the at least two busbars; and sensor electronics connected to the start regions, the end regions of the at least two busbars defining angled electrical connections of the sensor.

* * * * *